US006028510A

United States Patent [19]

Tamam et al.

[11] Patent Number: 6,028,510

[45] Date of Patent: Feb. 22, 2000

[54] VERIFICATION AND MONITORING SYSTEM PARTICULARLY SUITED FOR TAXI CABS

[75] Inventors: Amos Tamam, Nassau; Leonard Zuckerman, Suffolk, both of N.Y.

[73] Assignee: Metrometer Shop, Inc., Long Island City, N.Y.

[21] Appl. No.: 09/062,690

[22] Filed: Apr. 20, 1998

[51] Int. Cl.[7] .................................................... B60Q 11/00

[52] U.S. Cl. .......................... 340/458; 340/459; 340/460; 340/461; 340/438; 340/641; 340/652; 73/865.9; 307/10.8; 324/556

[58] Field of Search .................................... 340/458, 459, 340/460, 461, 438, 635, 641, 642, 652; 73/865.9; 307/10.8; 324/556

[56] References Cited

U.S. PATENT DOCUMENTS 3,975,708 8/1976 Lusk et al. .............................. 340/642
4,068,216 1/1978 Brouwer et al. ......................... 340/458
5,075,669 12/1991 Nakadozono et al. .................. 340/458

*Primary Examiner*—Julie Lieu
*Attorney, Agent, or Firm*—Howard C. Miskin; Gloria Tsui-Yip

[57] ABSTRACT

A verification and monitoring system for signal and status indicators and voice and metering features which is particularly suited for a taxi cab is disclosed. The operational status of the indicators are initially verified each time the ignition system of an associated taxi cab is energized. The verification circuit detects the failure of individual indicators even though a plurality of indicators may serve as a single visual display. The voice and metering features are continuously verified.

15 Claims, 3 Drawing Sheets

VERIFICATION AND MONITORING SYSTEM PARTICULARLY SUITED FOR TAXI CABS

BACKGROUND OF THE INVENTION 1.0 Field of the Invention

The invention relates to monitoring and verification systems and, more particularly, to a monitoring and verification system for use in taxi cabs to indicate and/or record a fault with various functions of the taxi cab.

2.0 Description of Related Art

Circuits for monitoring and verifying various signal functions of vehicles, such as turn signals, are well known and some of which are disclosed in U.S. Pat. Nos. 3,641,490; 4,001,777; 5,057,814; and 5,515,028, all of which are herein incorporated by reference.

Taxi cab businesses are highly regulated enterprises with the specific laws requiring their various signal, status, voice and fare metering facilities to be illuminated and verified at the appropriate time. The statutes require means be provided so that courteous audio messages are given at the start and at the end of each fare. Additionally, emergency flashers, located on the roofs of taxi cabs to indicate if the driver is in trouble should be tested frequently for the driver's safety. Furthermore, statutes also require a seal on the taxi transmission that provides distance traveled data so as to assure proper metering of each fare. Failure to comply with any or all of these requirements exposes the owner of the taxi cab to very high fines. It is desired that a monitoring and verification system be provided that not only assures that the taxi cab meets the various governmental requirements defined by statutes, but also ensures that such a verification be done in an accurate and reliable manner so as to assure the operational readiness of the taxi cab.

OBJECTS OF THE INVENTION

It is a primary object of the present invention to provide a verification and monitoring system particularly suited for a taxi cab having signal, status, voice and fare metering facilities.

It is a further object of the present invention to provide for a verification and monitoring system that verifies the operational readiness of all signal and status indicators of the taxi cab.

It is a further object of the present invention to provide for a verification and monitoring system that verifies the operational readiness of the signal and status indicators of the taxi cab each time the ignition system of the taxi cab is energized.

Further, it is an object of the present invention to provide a verification and monitoring system that verifies the operational readiness of the voice facility of the taxi cab, such voice facility often comprising a voice playback chip as well as an audio amplifier that drives a speaker.

Moreover, it is another object of the present invention to provide for a verification and monitoring system that verifies the operational readiness of the fare metering facility of a taxi cab by ensuring the integrity of the transmission seal of the taxi cab.

SUMMARY OF THE INVENTION

The invention is directed to a verification and monitoring system particularly suited for a taxi cab having an ignition system and having signal, status, voice and fare metering facilities, each signal and status facility having a visual display with each display comprising one or more indicators each having a light source which has continuity to a known potential. The system comprises a pulse generator, means for receiving the pulsed output of the generator, and indicating monitoring means. The pulse generator is activated in response to an initial activation of the ignition system and generates a pulsed output. The means for receiving the pulsed output is provided for each of the visual displays and receives an energizing signal for the signal and status facilities. The receiving means provides an output upon receipt thereof. The indicator monitoring means is provided for each of the visual displays and receives the output of the receiving means and has means for verifying the continuity of the light source of the one or more indicators of the respective visual display.

The verification and monitoring system further provides a monitoring circuit for the voice or audio facility and a monitoring circuit for the metering facility, in particular, the seal of the transmission for the fare metering facility of the taxi cab.

DETAILED DESCRIPTION OF THE PREFERRED EMBODIMENTS

Figure 1:
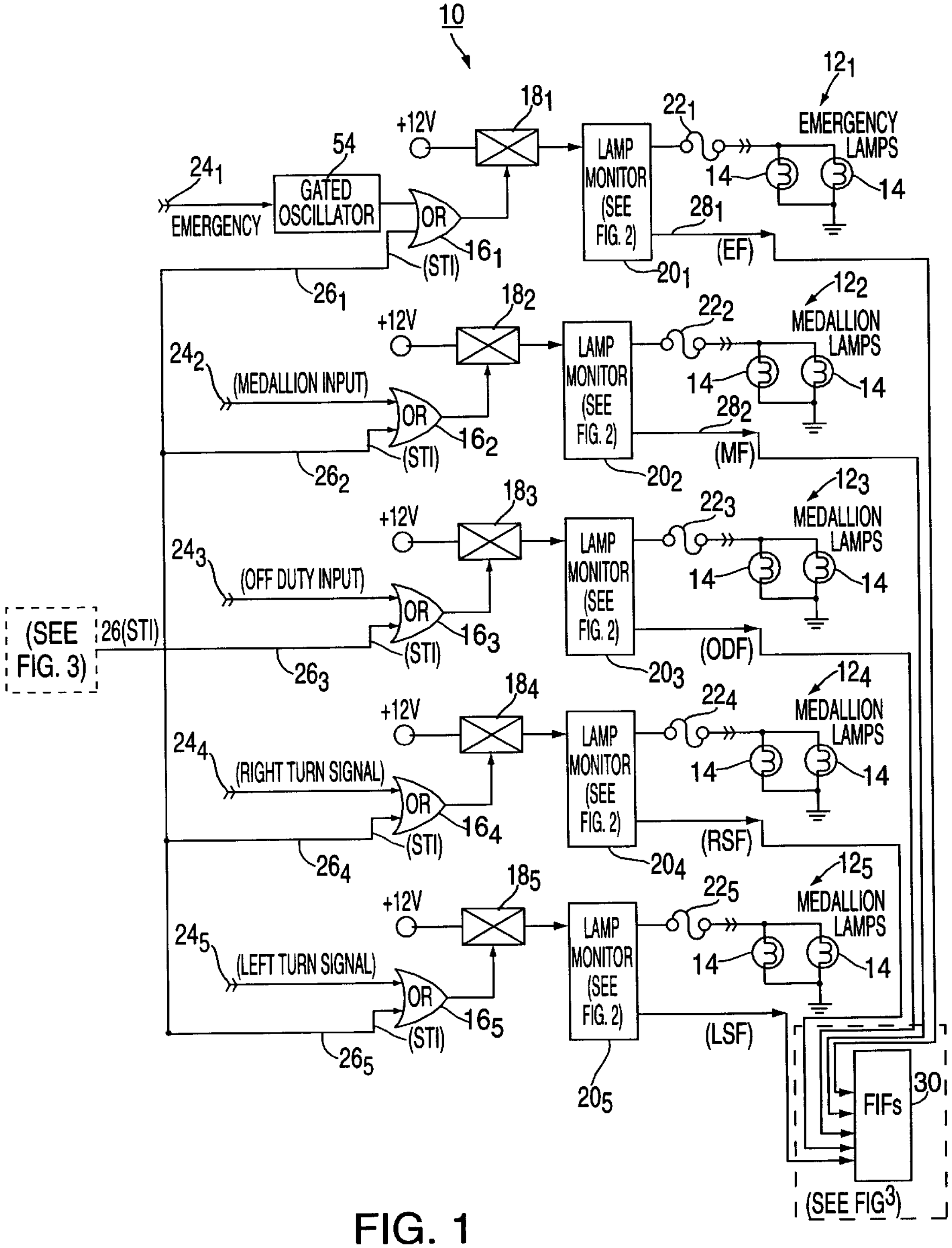
FIG. 1 is a block diagram of the monitoring and verification system of the present invention.

With reference to the drawing, wherein the same reference number indicates the same element throughout, there is shown in FIG. 1 a block diagram of the verification and monitoring system 10 of the present invention particularly suited for taxi cabs. The taxi cabs have an ignition system and also have signal, status, voice and fare metering facilities with the signal and status facilities each having a visual display with each visual display comprising one or more indicators each having a light source which has continuity to a known potential, such as ground.

As seen in FIG. 1, the taxi cab may have a plurality of visual displays $\mathbf{12}_1$, $\mathbf{12}_2$, $\mathbf{12}_3$, $\mathbf{12}_4$, and $\mathbf{12}_5$ which have the respective nomenclature of emergency lamps, medallion lamps, off duty lamps, right turn (RT) signal lamps and left turn (LT) lamps. Each of the displays $\mathbf{12}_1, \ldots \mathbf{12}_5$ comprises one or more light sources 14 which may be the filamentary type with one of its ends connected to a ground potential, as indicated in FIG. 1.

As seen in FIG. 1, the verification and monitoring system 10 further comprises a plurality of elements that are indicated as being interrelated to each other by their corresponding subscript. The description herein of an element not specified as having a subscript is generic to all elements having the same reference number.

Each of the visual displays $\mathbf{12}_1 \ldots \mathbf{12}_5$, such as $\mathbf{12}_1$ operatively cooperates with an OR circuit $\mathbf{16}_1$, a lamp driver switch $\mathbf{18}_1$, a lamp monitor circuit $\mathbf{20}_1$, to be further described with reference to FIG. 2, and preferably a fuse $\mathbf{22}_1$ or an equivalent device known in the art. The visual displays $\mathbf{12}_1$, $\mathbf{12}_2$, $\mathbf{12}_3$, $\mathbf{12}_4$, $\mathbf{12}_5$ are respectively responsive, via their associated OR circuit 16, to a signal or status energizing signal respectively shown as $24_1$ (emergency), $24_2$ (medallion input), $24_3$ (off duty input), $24_4$ (right turn signal) and $24_5$ (left turn signal). Each of the OR circuits 16, acting as means for receiving their respective energizing signal also receive a pulsed output 26 (start test input (STI)) generated by a pulse generator to be described with reference to FIG. 3. The pulsed output 26 is fanned out to each of the OR circuits $16_1$ . . . $16_5$ as shown in FIG. 1.

The lamp monitor circuits $20_1$, $20_2$, $20_3$, $20_4$ and $20_5$ respectively generate fault signals $28_1$ (emergency fault (EF)), $28_2$ (medallion fault (MF)), $28_3$ (off duty failure (ODF)), $28_4$ (right signal failure (RSF)), and $28_5$ (left signal failure (LSF)), each of which is routed to bistable means (F/Fs) 30 to be further described with reference to FIG. 3. The lamp monitor circuits $20_1$ . . . $20_5$ may be further described with reference to FIG. 2.

The lamp monitor circuit 20 operationally includes the lamp driver switch 18 acting as the switching device having one of its ends connected to a first predetermined voltage, such as +12 volts, and being responsive, via the output of OR circuit 16, to an energizing signal 24, such as that related to the signal or monitoring, of the taxi cab. Similarly, the switching device 18 is responsive, via the output of OR circuit 16, to signal 26 (start test input (STI)). The output of OR circuit 16 causes the switching device 18 to direct the +12 volts excitation to the output of the switching device 18.

Figure 2:
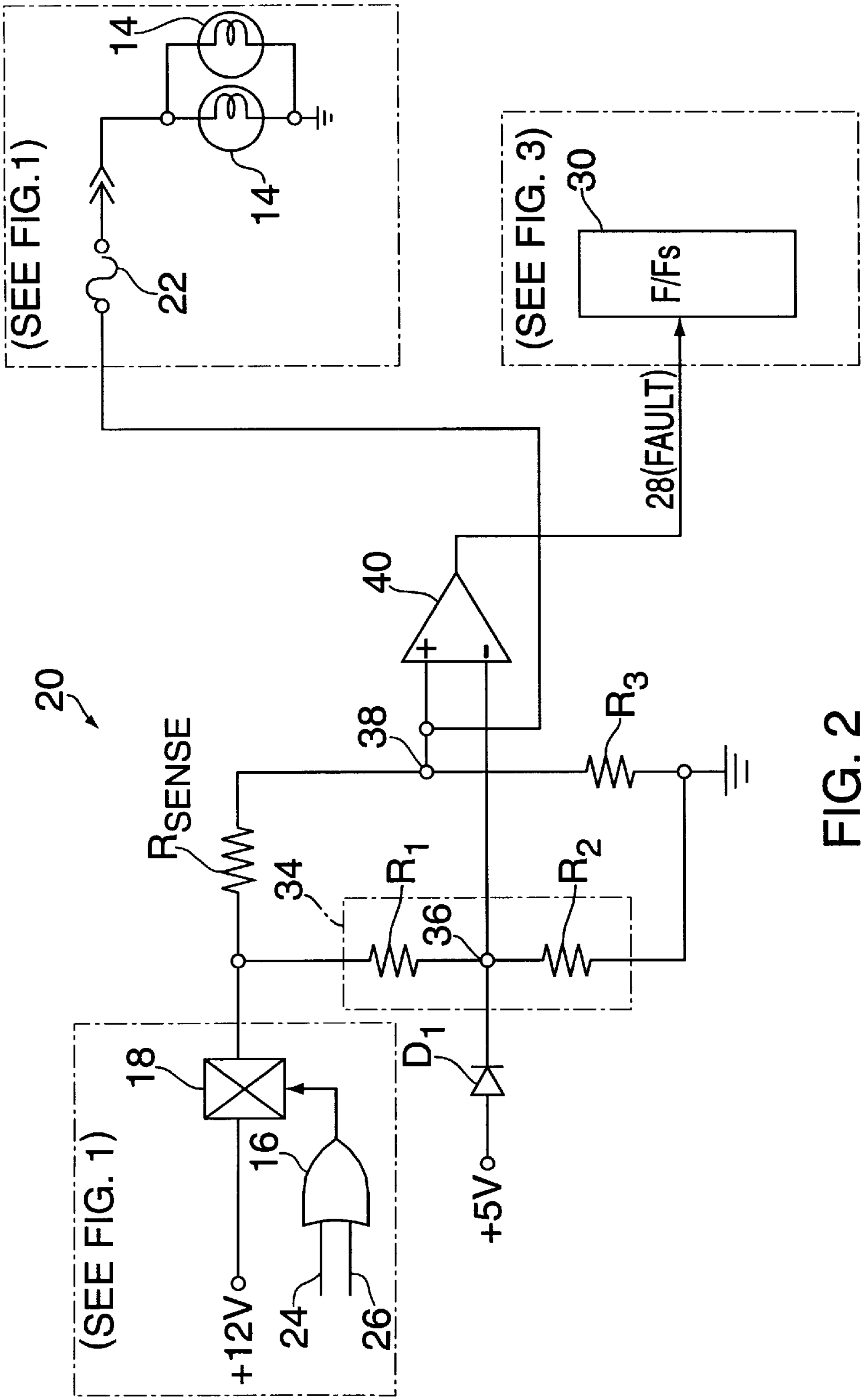
FIG. 2 illustrates details of the lamp monitor circuit generally shown in FIG. 1.

The lamp monitor circuit 20 further comprises a sensing resistor $R_{sense}$, a voltage divider network 34 comprised of first and second resistors R1 and R2 having a first node 36 shown in FIG. 2, a third resistor R3, a diode D1 having its anode connected to a second predetermined voltage, such as +5 volts, and its cathode connected to the first node 36. The values of the resistors $R_{sense}$, R1, R2, and R3 may be determined in a manner known in the art. The third resistor R3 has first and second ends, with the first end thereof connected to the second end of sensing resistor $R_{sense}$ so as to establish a node 38 therebetween. The lamp monitor circuit 20 further comprises a comparator 40 having first and second inputs respectively connected to the first and second nodes 36 and 38. The node 38 is preferably connected to a fuse 22 that is connected to one or more indicators 14 each of which has a continuity path to a known potential, such as ground. The comparator 40 develops an output signal, generally indicated as 28 (FAULT), and each output signal is routed to the bistable means (F/Fs) 30 of FIG. 3.

In general, each of the lamp monitor circuits 20 of FIG. 2 contains a lamp driver switch 18 capable of switching the indicators 14 on and off, and a current sensor $R_{sense}$ which senses the lamp current when the indicators are operating. The lamp monitoring circuit 20 preferably verifies the continuity of the fuse 22 which protects the lamp monitor circuit 20 in the event of an overload, such as a short circuit. Each of the lamp monitor circuits 20 is activated by a specific external stimulus 24, such as the medallion light energization signal $24_1$, or by the start test input (STI) signal 26. The (STI) 26 signal is generated each time the ignition system of the taxi cab is energized in a manner to be further described with reference to FIG. 3. The lamp monitor circuit 20 detects and responds to the presence or absence of a minimum current that should be drawn during the operational condition of the indicators 14. This detection is allowed if the fuse 22 is intact. If the fuse 22 is blown, the same indication of an indicator 14 burned out is provided, i.e., an indication of less than a predetermined amount of current being drawn. In operation, the lamp switch driver 18 turns the one or more indicators 14 on and the current sensing circuit shown in FIG. 2 senses the lamp current, that is, the current being drawn by the lamp or indicator 14. If the lamp current is equal to or greater than a predetermined value, the lamp monitoring circuit 20 does not output a signal 28. If the lamp current is less than predetermined value, the lamp monitor circuit 20 provides an output 28 to the bistable means 30. As used herein, an output signal, such as fault signal 28 produced by the lamp monitor circuit 20, that does not produce an alarm is referred to herein as a logic "0" and, conversely, a signal that does produce an alarm is referred to herein as a logic "1".

The lamp switch driver 18 passes the current that is routed to sensing resistor $R_{sense}$ which is connected in series to fuse 22 and the indicators 14. The voltage divider 34 creates a voltage across the resistor R1 when the lamp switch driver 18 is rendered conductive or closed and such voltage, via node 36, serves as a reference voltage for the comparator 40. The comparator 40 compares the voltage across the sensing resistor $R_{sense}$ present at node 38 with the voltage across resistor R1. If the voltage across the sensing resistor $R_{sense}$ is greater in value than that across resistor R1, the comparator 40 outputs a voltage level which is indicative of a logic 0 and which is also indicative that no fault exists. Conversely, if the voltage across sensing resistor $R_{sense}$, is less than that voltage across resistor R1, and the lamp switch driver 18 is closed, an output voltage level of the comparator 40 is high and is indicative of a logic 1 which, in turn, is indicative of a fault condition represented by the presence of a fault $28_1$ . . . or $28_5$.

The diode D1 and the third resistor R3 are utilized to ensure that when the lamp switch driver 18 is open, that is not rendered conductive, no fault output occurs, independent of whether or not the indicators 14 or the fuse 22 has failed. More particularly, if the indicators 14 and the fuse 22 are intact and the lamp switch driver 18 is open, the combined connections of the bias voltage, diode D1, resistor R1, resistor $R_{sense}$, fuse 22 and the indicators 14 connected to ground form a series circuit. The series circuit biases the negative input of the comparator 40 positive, with respect to the positive input of the comparator 40, which ensures that the comparator 40 output is a logic 0. If the fuse 22 or indicators 14 have failed, resistor R3, which has a relatively high value compared to the resistance of the indicators 14, provides a path to complete the series circuit (R1 and $R_{sense}$) to bias the comparator 40 so as to also produce a logic output 0. In this way, a fault output (created by a failed indicator 14, a fuse 22 or fault related to signals $24_1$ . . . $24_5$) can only occur when the lamp switch driver 18 is closed, the switch driver 18 being responsive to the output of the OR circuit 16.

The monitoring and verification provided by the lamp monitor circuit 20 of FIG. 2 is extremely accurate making it possible to reliably sense the failure of a single indicator 14, even when more than one indicator 14 is connected in parallel to form the visual display 12. For instance, if two indicators 14 are used for a visual display 12 and each indicator 14 draws two amperes, then, if the level of current being sensed by the circuit of FIG. 2 is set for 3.0 amps, failure of one or more indicators 14 reduces the current to less than 3.0 amps, and such failures are sensed by the circuit of FIG. 2. The lamp monitor circuit of FIG. 2 provides for faults (28) output which are routed to the flip-flops 30 that may be further described with reference to FIG. 3.

Figure 3:
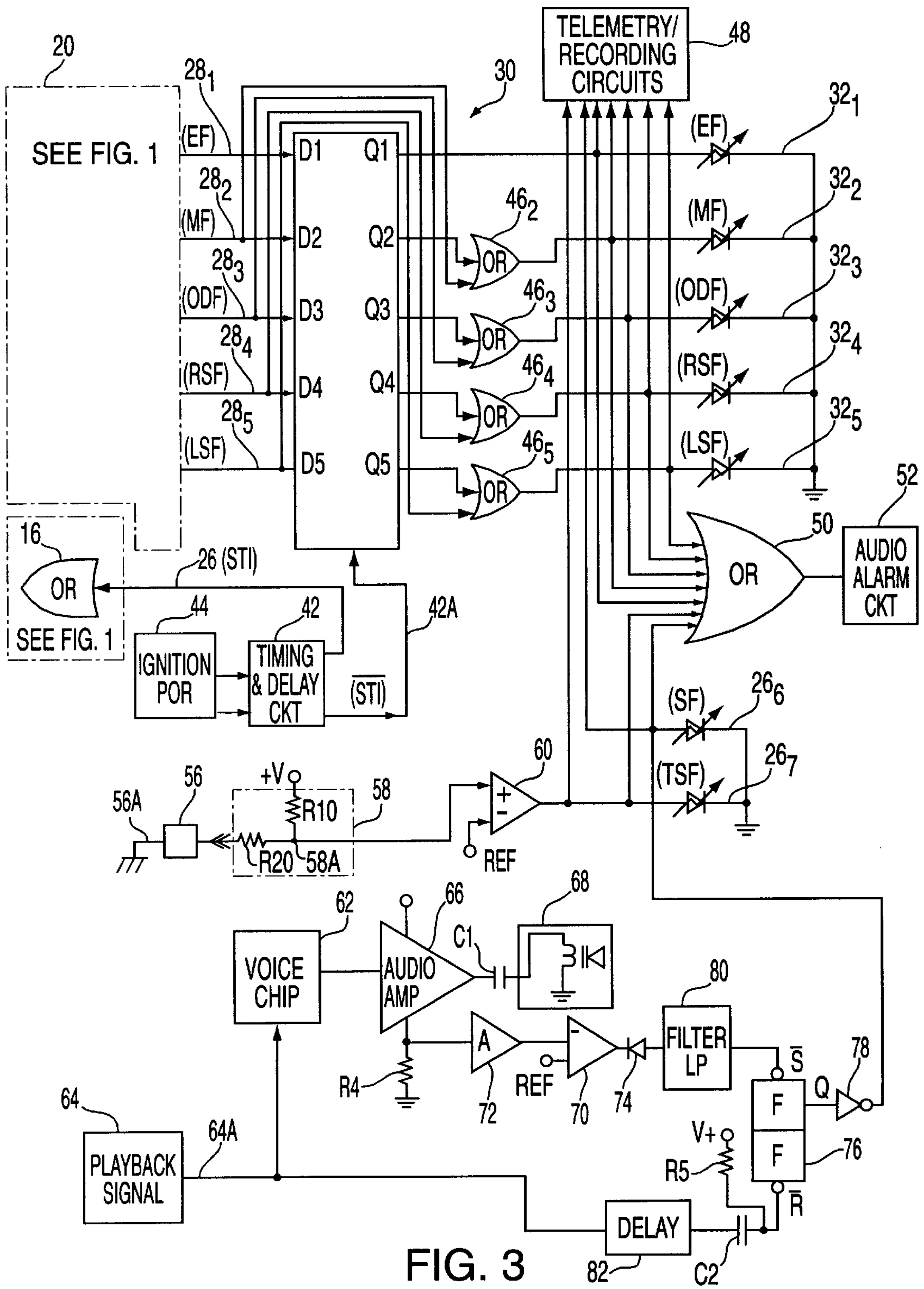
FIG. 3 is a block diagram of the speaker and fare transmission monitoring circuits and the circuit for combining the various fault outputs of the lamp monitor circuit of FIG. 2.

As seen in FIG. 3, the fault signals $28_1$ . . . $28_5$, discussed with reference to FIGS. 1 and 2, are applied to a respective "D" input of the "D" flip-flop 30 serving as a bistable means. The D flip-flop 30 has a clock input that is responsive to a negative going signal 42A, generated by timing and delay circuit 42 in response to the ignition power on reset (POR) 44, to be described.

As further seen in FIG. 3, the fault signals 28$_2$, 28$_3$, 28$_4$, 28$_5$, in addition to being routed to the respective D input of the D flip-flop 30, are also routed to respective OR circuits 46$_2$, 46$_3$, 46$_4$, and 46$_5$. The respective Q outputs of the D flip-flop 30 are also routed to the respective OR circuits 46$_2$, 46$_3$, 46$_4$, and 46$_5$. The outputs of the OR circuits 46$_2$, 46$_3$, 46$_4$, and 46$_5$ are respectively routed to the anode of light emitting diodes MF, ODF, RSF, LSF, the cathodes of which are connected to ground and which respectfully provide for visual alarm indicating signals 32$_2$, 32$_3$, 32$_4$, and 32$_5$. Furthermore, the Q output (Q1) of the D input (D1) related to the fault signal 28$_1$ is also routed to the anode of a light emitting diode EF having its cathode connected to ground and provides for the visual alarm signal 32$_1$. The anode of diodes EF, MF, ODF, RSF, and LSF, are routed to the telemetry/recording circuits 48 and also to respective inputs of OR circuit 50 which, in turn, provides an output to an audio alarm circuit 52.

The respective D inputs of the flip-flop 30 are clocked by the timing and delay circuit 42 which, in turn, is activated by the ignition power on reset circuit 44, which, in turn, is activated by turning the ignition key (not shown) on. The timing and delay circuit 42 has two outputs. The first output, which is a positive going, activated by the operation of the ignition system pulse, is the signal 26 (start test input (STI)) and which is applied to the OR circuits 16 of FIG. 1, which, in turn, causes all of the visual displays 12$_1$ . . . 12$_5$ to be turned on and remain on for the duration of the positive pulse 26.

During this activation period, all the currents associated with all the indicators 14 are measured and, at that time, any error detected by the lamp monitor circuit 20 is stored in the suitable storage element, such as that provided by the respective D stage of the flip-flop 30. The data stored in the flip-flop 30 can be changed (overridden) the next time the ignition switch is turned on. Additionally, all of the lamp fault inputs 28$_1$ . . . 28$_5$, are OR-ed together by OR circuit 50 and the OR circuit 50 provides an output that drives the audio alarm circuit 52. Thus, any fault represented by fault signals 28$_1$ . . . 28$_5$ cause a fault indicator to light by way of visual alarm signals 32$_1$ . . . 32$_5$. The fault signal 28$_1$ . . . 28$_5$ also causes an audio alarm to sound. All the lamp faults operate in a similar manner, except for the emergency fault 28$_1$.

As seen in FIG. 1, the emergency fault signal 28$_1$ is energized in an emergency situation by the emergency input 24$_1$. The signal 24$_1$ is applied to a gated oscillator 54 which produces a repetitive on-off signal that is applied to the lamp switch driver 18$_1$ which causes the lamp monitor circuit 20 to operate in a manner as previously described with reference to FIG. 2. The gated oscillator 54 causes emergency lamp display 12$_1$ to switch on and off repetitively when emergency input 24$_1$ is activated and is mechanized so as to also operate when the ignition switch is turned off so that the emergency lights may be operated with the taxi cab ignition off.

The monitoring and verification system 10 further provides for monitoring circuits to check for a speaker fail condition represented by visual alarm signal 26$_6$, as well as to check for a transmission seal fail condition represented by visual alarm signal 26$_7$ and which may be further described with reference to FIG. 3.

As is known in the art, the integrity of the fare metering facility of the taxi cab may be established by a transmission seal generally indicated in FIG. 3 by reference number 56. If the transmission seal 56 remains intact so does the reliability of the fare recorded by the metering facility of the taxi cab. The transmission seal 26 has a wire that allows the transmission seal 26 to be connected to a ground 56A. If the wire is broken, not connected, or the seal is missing, the practice of the present invention generates the visual alarm signal 26$_7$ and also causes the audio alarm circuit 52 to be activated via OR circuit 50, as well as causes the signal to be recorded by the telemetry and recording circuits 48 as shown in FIG. 3.

The telemetry and recording circuits 48 are known in the art, wherein the telemetry portion provides for the transmission of data signals over a distance, and the reception and application of the signals to indicating instruments, and whereas the recording circuit portion may comprise recorders that are housed on the taxi cab.

The monitor circuit of FIG. 3 for the transmission seal 56 comprises a voltage divider 58 comprising resistor R10 and resistor R20. The values of the resistors R10 and R20 may be determined in a manner known in the art. The voltage divider 58 has a node 58A formed by resistors R10 and R20 and one side of R10 is connected to a predetermined voltage (+V) having a typical value of 5.0 volts. In operation, the voltage divider 58 provides for a predetermined voltage at node 58A which, in turn, is routed to the positive input of the comparator 60 having its negative input connected to a reference (REF), and if this predetermined voltage is not within a desired range, then the comparator 60 produces an output signal representative of the visual alarm signal 26$_7$. More particularly, the output signal is applied to the anode of a light emitting diode TSF which has its cathode connected to ground and which produces the visual alarm signal 26$_7$.

More particularly, if the transmission seal 56 is intact, then one side of the resistor R20 is effectively connected to ground. This ground continuity provides a desired voltage to the comparator 60 which is compared against another desired voltage (REF) present at the (–) input of comparator 60, and if the voltage at node 58A is less than the REF level, an output voltage of essentially zero (logic “0”) is developed by comparator 60 and, thus, no visual alarm signal 26$_7$ is generated. Conversely, if the wire to the transmission seal 56 is absent or the wire is not connected, the voltage produced at node 58A activates the comparator 60 so that an output voltage (logic “1”) is produced by the comparator 60 and which is indicative of the fault signal 26$_7$.

Although the arrangement of FIG. 3 of the voltage divider 58, the comparator 60 and a single connection to the transmission seal 56 provides for the verification of the transmission seal 56, other arrangements are contemplated by the practice of the present invention. For example, a resistor may be added to the transmission seal 56 and a sensing wire connected to this added sensing resistor may be arranged so as to provide for operative comparative type inputs to another comparator, similar to comparator 60. This other comparator, in combination with comparator 60, can then be utilized to determine that the resistances between two limits (each respective limit being established by each comparator) of the arranged comparators. If the two limits do not agree, then an alarm signal (26$_7$) may be generated. Furthermore, other embodiments involving the operative use of ac currents and reactive components are also contemplated by the practice of the present invention.

The verification and monitoring system 10 of the present invention further includes a monitoring circuit shown in FIG. 3 for the voice facility of the taxi cab which produces the visual alarm signal 26$_6$ representative of a speaker failure that is routed to the OR circuit 50, as well as the telemetry and recording circuits 48, which responds, in turn, in a manner similar to that previously described with reference to visual alarm signal $\mathbf{26}_7$ related to the transmission seal failure. Further, the visual alarm signal $\mathbf{26}_6$ uses a light emitting diode SF having its cathode connected to ground and arranged in the same manner as light emitting diode TSF.

The voice facility comprises a conventional voice playback chip 62 that generates a courteous message at the start and end of each fare of the taxi cab in response to the signal 64A generated by a playback signal known in the field of taxi cabs. The voice facility further includes an audio amplifier 66 that is coupled to a speaker 68 by way of a capacitor C1 known in the art. The monitoring circuit for this voice facility is interconnected to the audio amplifier 66 and comprises a sensing resistor R4, a comparator 70, preferably an amplifier 72, preferably a rectifying means 74, a bistable (F/F) device 76, an inverter 78, a low pass filter 80, and a differentiating circuit comprising resistor R5 connected to a predetermined voltage, such as 5.0 volts, and a capacitor C2.

In general, the monitoring circuit of the present invention for the voice facility measures the current drawn by the audio amplifier 66. When the speaker 68 is connected to the amplifier 66 and an audio message is generated by voice chip 62 and the representative signals thereof are applied to amplifier 66, causing the amplifier 66 current to be appreciable. Conversely, if the speaker 68 is disconnected, the amplifier 66 current is relatively low. One side of the audio amplifier's 66 power connection (preferably the negative side) is connected to one end of the current sensing resistor R4 having its other end connected to ground.

The current sensing resistor R4 transforms the current through it into a voltage. The voltage is preferably amplified by amplifier 72 which, in turn, provides an output that is routed to the negative input of the comparator 70 having a known and fixed positive potential (REF) at its positive input. If the current of the audio amplifier flowing through the sensing resistor R4 produces an amplified voltage at the output of amplifier 72 which is greater than the positive potential (REF), the output of the comparator 70 is essentially zero (0) amps representative of a logic 0, thus, preventing the visual alarm signal $\mathbf{26}_6$ from occurring.

The comparator 70 output is negatively rectified and filtered by diode 74 and the low pass filter 80, respectively, so as to eliminate any ac components. The filtered output from filter 80 is applied to the not-set side of the set-reset flip-flop 76. Additionally, the presence of signal 64A that activates the voice playback chip 62, also drives the delay circuit 82, the output of which is capacitively coupled via capacitor C2 of the differentiating circuit with R5 to the not-reset side of the set-reset flip-flop 76.

The message provided by playback voice chip 62 is initiated by the signal 64A and signal 64A also initiates a delay by way of delay means 82. During such a delay, the courteous message begins and the amplifier 66 starts to draw significant current which is sensed by the sensing resistor R4. The output of the current sensing resistor R4 is amplified and compared to a predetermined level, such as that yielded by the reference (REF) voltage, then rectified and filtered by elements 74 and 80, respectively. If the speaker 68 is connected, the not-set side of the flip-flop is "0" value (comparator 70 output of essentially zero volts) which forces the Q output of the flip-flop to be "1" regardless of the state of the not-reset input. Therefore, the not-reset pulse entering the flip-flop, via the output of capacitor C2 at the end of the delay has no effect on the Q output of the flip-flop which maintains its level at the logic "1." This logic "1" is inverted by inverter 78 so as to prevent the visual alarm signal $\mathbf{26}_6$ indicative that the speaker 68 is operative. Conversely, if the speaker 68 is disconnected, the level at the not-set side of flip-flop 76 is "1" because the current of amplifier 66 is too low to meet the threshold requirements of the comparator 70. Since the not-reset input of the flip-flop 76 is "1," when the delay operation of the delay circuit 82 completes and the comparator 70 provides a logic "0" to the not-set side of the flip-flop 76, the flip-flop 76 changes state and the Q output becomes 0. The Q output is inverted and the inverted output becomes the speaker visual fault signal $\mathbf{26}_6$ which drives the audio alarm circuit 52 as well as being sensed by the telemetry and recording circuits 48.

Although the arrangement of the monitoring circuit of FIG. 3 for the audio facility of the taxi cab serves well its intended purposes, the practice of the present invention contemplates other arrangements. For example, the practice of the present invention may utilize a sense resistor in the speaker lines. The contemplation further envisions the utilization of a-c coupling between the audio amplifier 66 and the comparator 70 or another point in the circuit possibly to form a capacitor coupled voltage-doubler circuit which provides for increased sensitivity. In addition, several of the styles of speaker sensing sensors are anticipated and which include adding a small d-c current to the speaker 68 output and measuring the d-c voltage due to the d-c current so as to monitor and detect the operational readiness of the speaker 68. Such detected techniques would allow for the detection even when the message is not being delivered.

It should now be appreciated that the practice of the present invention provides for a verification and monitoring system particularly suited for a taxi cab having an ignition system and signal, monitor, voice and fare metering facilities each having a visual display with each display comprising one or more indicators each having a light source.

Although certain features of the invention have been illustrated and described herein, better modifications and changes will occur to those skilled in the art. It is, therefore, to be understood that the appended claims are intended to cover all such modification and changes that fall within the spirit of the invention.

What we claim is:

1. A verification and monitoring system particularly suited for a taxi cab having an ignition system, a voice facility, said voice facility comprising one or more speakers and having means including an audio amplifier that drives said speakers for providing an audio message at the start and end of each fare of said taxi cab, and with signal and status facilities actuated by respective facility energizing signal, each facility having a visual display, with each display comprising one or more indicators, each indicator having a light source which has continuity to a known potential, said system comprising:

(a) a pulse generator actuated in response to an initial actuation of said ignition system and generating a pulsed output;

(b) means associated with each of said visual display for receiving said pulsed output and also for receiving said facility energizing signal, said receiving means providing an output upon receipt of said pulsed output or said facility energizing signal;

(c) indicator monitoring means for each of said visual display receiving the output of said corresponding receiving means and having means for verifying the continuity of said light source of a corresponding visual display; and (d) visual alarm means and means interconnected to said audio amplifier for detecting a predetermined level of current of said audio amplifier during said providing of said audio message.

2. The verification and monitoring system according to claim 1, wherein said means interconnected to said audio amplifier comprises:

(a) a sensing resistor having a first end connected to said audio amplifier and a second end connected to a known potential, said sensing resistor having a resistance selected so as to provide a predetermined voltage within a range at the first end thereof; and (b) a comparator connected to said first end of said sensing resistor and producing an output voltage when said predetermined voltage is not within said range and said output voltage being routed to said visual alarm means.

3. The verification and monitoring system according to claim 2, wherein said means interconnected to said audio amplifier further comprises an amplifier interposed between said first end of said sensing resistor and said comparator.

4. The verification and monitoring system according to claim 2, wherein said audio message is initiated in response to a start command and wherein said means interconnected to said audio amplifier further comprises:

(a) a rectifying means connected to the output of said comparator and providing an output therefrom; and (b) bistable means responsive to the presence of both said output of said rectifier means and said start command.

5. The verification and monitoring system according to claim 4, wherein said means interconnected to said audio amplifier further comprises a low pass filter interposed between the output of said rectifying means and said bistable means.

6. The verification and monitoring system according to claim 4, wherein said means interconnected to said audio amplifier further comprises delay means receiving said start command and providing a delay output thereof to said bistable means.

7. The verification and monitoring system according to claim 2, wherein said output voltage is further connected to telemetry/recording circuits.

8. The verification and monitoring system according to claim 2, wherein said output voltage is further connected to an OR means having an output that is connected to an audio alarm circuit.

9. A verification and monitoring system particularly suited for a taxi cab having an ignition system and with signal and status facilities actuated by respective facility energizing signal, each facility having a visual display, with each display comprising one or more indicators, each indicator having a light source which has continuity to a known potential, said system comprising:

(a) a pulse generator actuated in response to an initial actuation of said ignition system and generating a pulsed output, wherein said pulse generator further generates a delayed pulsed output;

(b) means associated with each of said visual display for receiving said pulsed output and also for receiving said facility energizing signal, said receiving means providing an output upon receipt of said pulsed output or said facility energizing signal;

(c) indicator monitoring means for each of said visual display receiving the output of said corresponding receiving means and having means for verifying the continuity of said light source of a corresponding visual display, wherein said indicator monitoring means generates an output fault signal if said continuity of said light source of said respective visual display is not verified;

(d) visual alarm means;

(e) a bistable device for each of said corresponding visual display, said bistable device receiving said output fault signal and generating an output therefrom that is routed to said visual alarm means, wherein said bistable device further receives said delayed pulsed output and said bistable device generates said output therefrom during the presence of both of said delayed pulsed output and said output fault signal; and (f) an OR means for each of said bistable devices and having first and second inputs with the first input connected to the output of said bistable device and the second input connected to the output fault signal of the respective visual display, said OR means providing an output that is connected to said respective visual alarm means.

10. The verification and monitoring system according to claim 9, wherein said output of each of said OR means is further connected to telemetry/recording circuits.

11. The verification and monitoring system according to claim 9, wherein said output of each of said OR means is further connected to another OR means having an output that is connected to an audio alarm circuit.

12. A verification and monitoring system particularly suited for a taxi cab having an ignition system, a fare metering facility, said fare metering facility having a seal with continuity means for connecting said seal to a known potential, and with signal and status facilities actuated by respective facility energizing signal, each facility having a visual display, with each display comprising one or more indicators, each indicator having a light source which has continuity to a known potential, said system comprising:

(a) a pulse generator actuated in response to an initial actuation of said ignition system and generating a pulsed output;

(b) means associated with each of said visual display for receiving said pulsed output and also for receiving said facility energizing signal, said receiving means providing an output upon receipt of said pulsed output or said facility energizing signal;

(c) indicator monitoring means for each of said visual display receiving the output of said corresponding receiving means and having means for verifying the continuity of said light source of a corresponding visual display;

(d) a monitor circuit for said fare metering facility, said monitor circuit having visual alarm means and means for verifying the continuity of said seal to said known potential, wherein said monitor circuit comprises a voltage divider network having one end connected to a voltage source and a node connected to a comparator and having a predetermined voltage thereat within a range when said continuity of said seal is verified, said comparator producing an output signal when said predetermined voltage is not within said range and said output signal being routed to said visual alarm means, wherein said output signal is further connected to telemetry/recording circuits.

13. A verification and monitoring system particularly suited for a taxi cab having an ignition system and with signal and status facilities actuated by respective facility energizing signal, each facility having a visual display, with each display comprising one or more indicators, each indicator having a light source which has continuity to a known potential, said system comprising:

(a) a pulse generator actuated in response to an initial actuation of said ignition system and generating a pulsed output;

(b) means associated with each of said visual display for receiving said pulsed output and also for receiving said facility energizing signal, said receiving means providing an output upon receipt of said pulsed output or said facility energizing signal;

(c) indicator monitoring means for each of said visual display receiving the output of said corresponding receiving means and having means for verifying the continuity of said light source of a corresponding visual display; and (d) a switching device interposed between said output of said receiving means and said indicator monitoring means, said switching device applying a predetermined voltage to said indicator monitoring means in response to the presence of said output of said receiving means.

14. A monitoring device for a visual display comprised of one or more indicators each having a light source which has continuity to a known potential, said monitoring device comprising:

(a) a switching device connected to a first predetermined voltage and responsive to a signal to direct said first predetermined voltage to its output;

(b) a sensing resistor having first and second ends with the first end connected to said output of said switching device;

(c) a voltage divider network having first and second ends and comprised of first and second resistors having a first node therebetween and with the first end connected to said output of said switching device and the second end connected to a known potential;

(d) a diode having its anode connected to a second predetermined voltage and its cathode connected to said first node;

(e) a third resistor having first and second ends with the first end connected to the second end of said sensing resistor and forming a second node therebetween, said second node being connected to said visual display, said third resistor having its second end connected to said known potential; and (f) a comparator having first and second inputs respectively connected to said first and second nodes.

15. A method for verifying the facilities of a taxi cab having an ignition system, a voice facility, wherein said voice facility is provided with one or more speakers and means including an audio amplifier that drives said speakers for providing an audio message, and a signal facility and a status facility, each signal and status facility having a visual display, with each display comprising one or more indicators, each indicator having a light source which has continuity to a known potential, said method comprising:

providing a pulsed signal in response to an initial actuation of said ignition system;

providing a facility energizing signal in response to an actuation of said signal or status facility;

receiving said pulsed signal and facility energizing signal and generating an output upon receipt of said pulsed signal or facility energizing signal;

monitoring each of said visual display upon receiving said output and verifying the continuity of said light source of said corresponding visual display; and detecting a predetermined level of current of said audio amplifier during said providing of said audio message.

* * * * *